G. R. WINKLER.
Disk Steam-Engine.

No. 167,146. Patented Aug. 24, 1875.

Attest:
R. N. Dyer
Charles Thurman

Inventor:
Gustavus R. Winkler
by Geo. W. Dyer
Atty.

G. R. WINKLER.
Disk Steam-Engine.

No. 167,146. Patented Aug. 24, 1875.

3 Sheets--Sheet 2.

Attest:
R. N. Dyer.
Charles Thurman

Inventor:
Gustavus R. Winkler
by Geo. W. Dyer
atty

3 Sheets--Sheet 3.

G. R. WINKLER.
Disk Steam-Engine.

No. 167,146. Patented Aug. 24, 1875.

Attest:
Charles Thurman,
R N Dyer

Inventor:
Gustavus R. Winkler
By Geo. W. Dyer & Co.
Attys.

UNITED STATES PATENT OFFICE.

GUSTAVUS R. WINKLER, OF WILLIAMSPORT, PENNSYLVANIA.

IMPROVEMENT IN DISK STEAM-ENGINES.

Specification forming part of Letters Patent No. 167,146, dated August 24, 1875; application filed June 21, 1875.

*To all whom it may concern:*

Be it known that I, GUSTAVUS R. WINKLER, of Williamsport, in the county of Lycoming and State of Pennsylvania, have invented a new and Improved Disk Steam-Engine; and I do hereby declare that the following is a full and exact description of the same, reference being had to the accompanying drawings, and to the letters of reference marked thereon.

The object of my invention is the production of a disk steam-engine which will have uniform velocity in the revolution of its shaft, avoid, as much as possible, friction of its several working parts, be simple and cheap in its construction, and economical and effective in use; and my invention therein consists in the peculiar construction of the disk; in the combination of the disk with two steam-chambers, of peculiar construction, placed on either side of it; in the form of the disk-chamber; in the combination of the disk, the disk-chamber, and the steam-ports, all of which parts, by their peculiar construction, and their manner of operation in consequence of that construction, balance the axis and disk in their revolutions, and avoid the usual friction; and in the construction, combination, and arrangement of the various operative parts, all as more fully hereinafter described and explained.

To enable others skilled in the art to make and use my invention, I now proceed to describe the same in connection with the drawings, in which—

Figure 1:
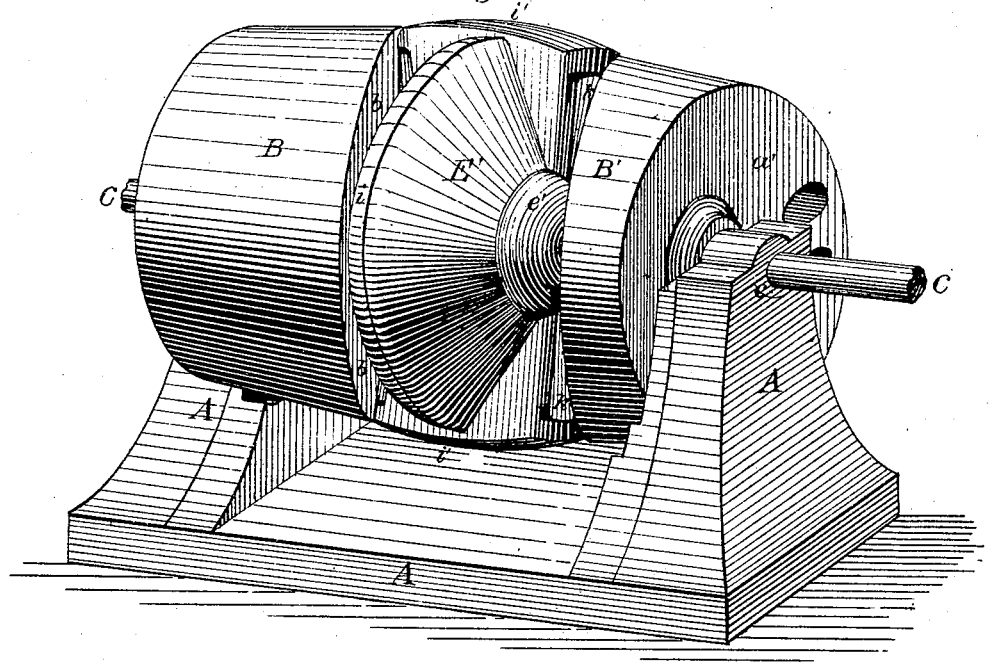
Figure 2:
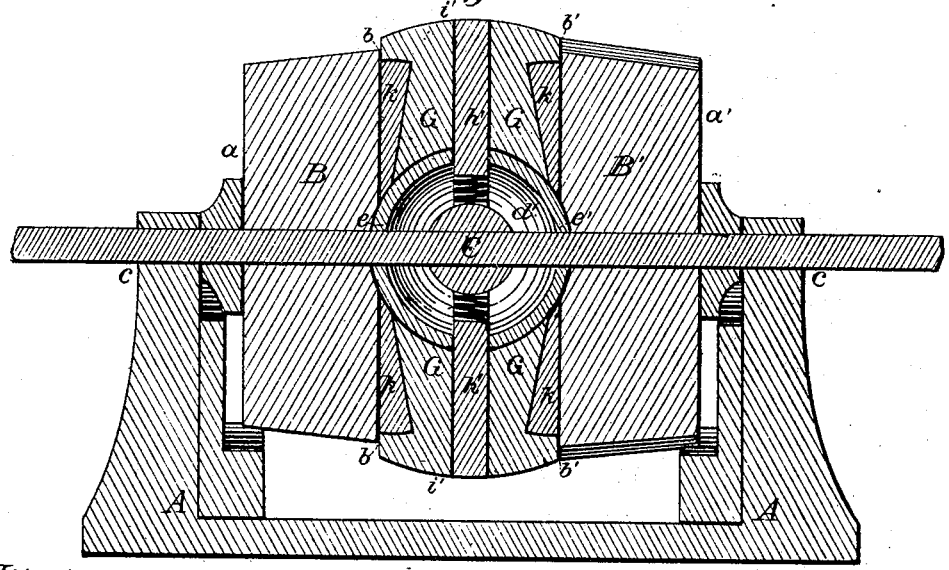
Figure 3:
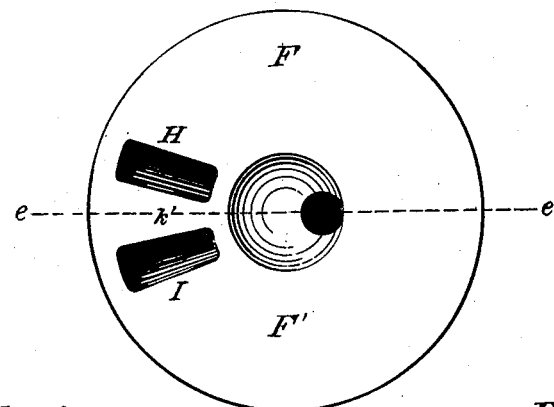
Figure 4:
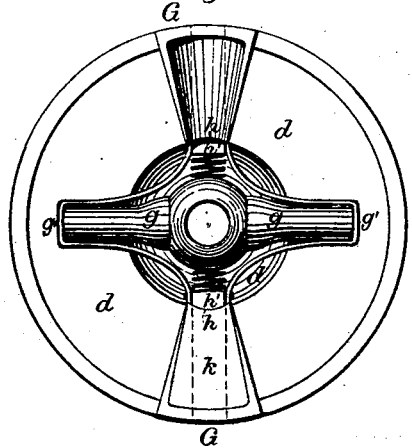
Figure 5:
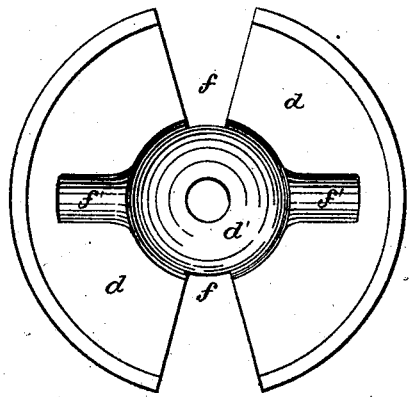
Figure 6:
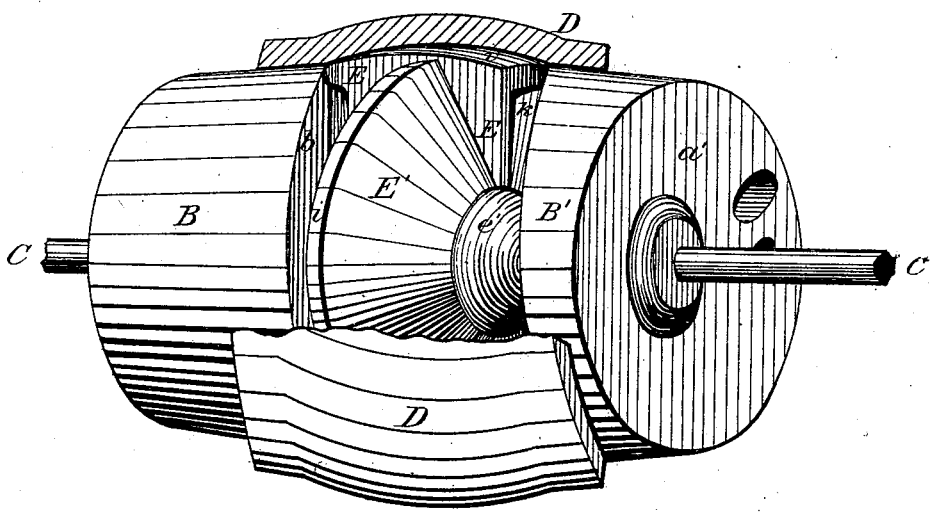

Figure 1 represents a perspective view, with the casing removed; Fig. 2, a longitudinal section on the line of the main shaft; Fig. 3, a separate view of the inside of one of the abutment-heads, showing, by the line $e\ e$, the place against which the disk abuts, and also one set of steam and exhaust ports. Figs. 4 and 5 are separate views of the disk taken apart, showing the form of said disk and the connection of the pistons. Fig. 6 is a perspective view, with the casing partly broken away to illustrate the form of the casing and disk-chamber.

Like letters denote corresponding parts in each figure.

A represents a suitable frame-work, upon which are mounted two circular abutment-heads, B B', rigidly secured thereto. These heads have, when in position, their outer surfaces $a\ a'$ parallel to each other, and at right angles to the main shaft, hereafter described, and contain steam-chambers of cylindrical form, as to their periphery, but wedge-shaped in cross-section. These heads have their inner plane surfaces $b\ b'$ at an angle with their outer surfaces $a\ a'$, but also parallel to each other. A shaft, C, passes steam-tight through the heads B B' diagonally, passing through one head at a point at one side of the center thereof, and through the other head at a point on the opposite side of the center thereof, and is journaled in uprights $c\ c'$ of the frame-work, so that the inner faces $b\ b'$ and the outer faces $a\ a'$ of the heads stand at an angle to said shaft, but at the same time parallel to each other. The heads B B' are arranged on the shaft a proper distance apart, and are connected by a casing, D, in the form of an arc of a circle, so that it incloses, with the space between the heads, a space, which I call the disk-chamber E, which is a segment of a sphere, with sides parallel, but standing diagonally to the shaft. In this space is mounted, on the shaft C, and at right angles to said shaft, a disk, E', formed, preferably, in the shape of two obtuse right cones, with hemispherical bosses $e\ e'$ placed horizontally and joined at their bases, the shaft passing through their vertices, which revolve in corresponding depressions or recesses in the inner faces $b\ b'$ of the heads. The inner sides of the disks are plane surfaces, adapted to be bolted closely and firmly to each other, except that the central sections $d$ are hollowed out, as shown at $d'$. These inner faces $d$ have transverse slots $f$, extending through the same as far as the periphery of the bosses, for the reception of the pistons G, to be hereafter described, and at right angles with said slots cut-away portions $f'$, to receive and hold the ends of the spring cross-piece $g$, which cross-piece is also held by the passage through it of the main shaft. Into the slots $f$ named the pistons G, which are wedge-shaped, are inserted, extending as far as the periphery of the bosses, and upon their inner ends $h$ are curved to conform to the exterior curve of said bosses. Arms $h'$ extend inwardly from the center of the curved inner ends, and the inner ends of these arms are secured to the center of an elliptic spring, $g'$, which passes over the ends of the cross-piece $g$, and is secured to them in any convenient manner to allow rotation.

By this means a spring endwise is given to the pistons. At the same time the pistons are pivoted upon said spring, and have a lateral movement at their outer ends. The periphery $i$ of the disk comes in contact at every point with the inner surface of the casing D, and is provided with suitable packing. The shaft C stands at such an angle to the surfaces $b\ b'$ of the heads that the disk will touch such inner faces on either side, and, being formed as described, will always have two lines in contact with said inner faces the whole distance from the bosses to the periphery of the disk, as shown by the lines $e\ e$, and thus the disk makes two separate steam-spaces, F F', of the steam-chamber steam-tight.

The pistons G have their edges $i'$ formed on the arc of a circle, and packed steam-tight by the pressure of the spring $g'$ and suitable packing to fit the casing D, over which they slide, and their edges $k$ formed in the shape of a longitudinal section of a cylinder, so that at every point the edges $k$ will be in contact throughout their entire length with the surfaces $b\ b'$. On either side of the lines $e\ e$ are the steam and exhaust ports H I, arranged without valves, and separated by a partition, $k'$, so that each steam-chamber is entirely cut off at that point, and so that there may be a continual entrance of live steam, and a continual exit of exhaust.

The steam entering the ports H H upon each side of the disk presses upon the pistons G and turns the shaft. At every passage of the lines $e\ e$ the steam exhausts, and the piston receives a jet of live steam. Thus the live steam from the ports H is continually pressing on one of the pistons, while the steam is continually passing out of the ports I.

The steam enters each chamber, acts upon the piston, and exhausts continually, there being no valves or cut-off, so that the force of steam acting uniformly upon each side of the disk continuously gives an uniformity of revolution to the disk and its shaft. If it be desired to reverse the motion of the engine, the steam is admitted in the exhaust-ports, and the steam-ports used to exhaust.

It is apparent that this device can be modified in many particulars without departing from the spirit of this invention, as, for instance, the number of the pistons can be different to adapt the engine to different purposes.

It will be perceived that each piston is, in its position relative to the head, a screw-blade and a true paddle. When the piston enters the smallest end of one of its chambers, it enters as a paddle, perpendicular to disk and head; thence, until it reaches the center of the largest part of the same chamber, it is a screw-blade, (of a right or positive screw,) perpendicular to the disk and at an angle to the head. In the center position it is a true paddle—thence, to the place where it entirely disappears, it is a left-handed or negative screw-blade, acting with all the properties of paddle and screw; and, if reversed, the first is left-handed and the second is right-handed.

By the peculiar form of the disk, in two cones placed with bases together, the external lines of the disk, which touch the inner faces of the heads, coincide and continually make steam-tight joints, while at the opposite point upon the disk, the same form gives the greatest enlargement of the chamber, with the greatest size precisely where the piston affords the largest area for the impact of steam, viz, at its outer end.

The bosses, by their spherical form, turning in similar shallow spherical recesses in the inner faces of the heads, in their revolutions, always present a similar portion of their exterior within said recess, and make a steam-tight journal, with little friction. Their form, moreover, presenting inclines quite similar to those of the parts of the disk nearest to them, gives no impediment either to the forward movement or expansion of the steam in the disk-chamber.

From the peculiarity of the diagonal form of the disk-chamber with parallel sides, being the inner faces of the heads, it results that two steam-chambers are formed, of a size corresponding with the size of such faces, and extending entirely across them in a wedge form, adapted for the better expansion of the steam, and for its impact against the pistons. From its form of a central section of a sphere, it follows that the periphery of the disk-chamber is spherical or rounded upwardly, from which it results that the similarly-rounded outer end of the piston in every part of its revolution is packed tightly, a result which could not be obtained if the periphery of the disk-chamber was not thus rounded. By reason of the shaft or axis passing through the heads upon opposite sides of the center of the same, the steam-chambers in each side of the disk, are enlarged in opposite directions. In the operation of this engine the steam, entering the steam-chambers on each side of the disk impelling the piston, expanding and exhausting continuously, it follows that there is at all times an equal pressure upon each side of the disk, and the same is balanced, and both disk and axis, or shaft, are almost wholly relieved of friction. By means of this construction I am enabled to preserve steam-tight joints, and to save the loss of steam by leakage, and the rapid wear of packing incident to other rotary engines.

Having thus described my invention, what I claim as new therein, and desire to secure by Letters Patent, is—

1. In a disk-engine, the disk E', in the form of two obtuse cones with hemispherical bosses united at the bases, substantially as and for the purposes set forth.

2. In a disk-engine, the combination of the double-cone disk E' and the diagonal abutments B B', the several parts constructed and arranged substantially as and for the purposes set forth.

3. In a disk-engine, the combination of the diagonal parallel plane-heads $b$ and the curved casing D, the whole inclosing a diagonal chamber, E, of the form of a central segment of a sphere, substantially as described.

4. In a disk-engine, the combination of the pistons G, having rounded outer ends, and the diagonal disk-chamber E, with parallel plane sides, having the rounded casing D, substantially as and for the purposes set forth.

5. In a disk-engine, the combination, with the disk E', of the pistons G, the spring $g'$, and cross-piece $g$, constructed and arranged substantially as and for the purposes set forth.

6. In a disk-engine, in combination, the double-cone disk, having the pistons G and the diagonal disk-chambers E E, all constructed and arranged substantially as and for the purposes set forth.

7. In a disk-engine, the combination of the disk E', the disk-chamber E and the ports H I, adapted to admit and exhaust steam continuously upon each side of the disk, for the purpose of balancing the same, substantially as explained.

This specification signed and witnessed this 15th day of June, 1875.

GUSTAVUS R. WINKLER.

Witnesses:
GEORGE WOLF,
AUGUSTUS F. DIENER.